(No Model.)
T. CRANEY.
APPARATUS FOR AERATING AND CARBONATING WATER.
No. 524,888. Patented Aug. 21, 1894.
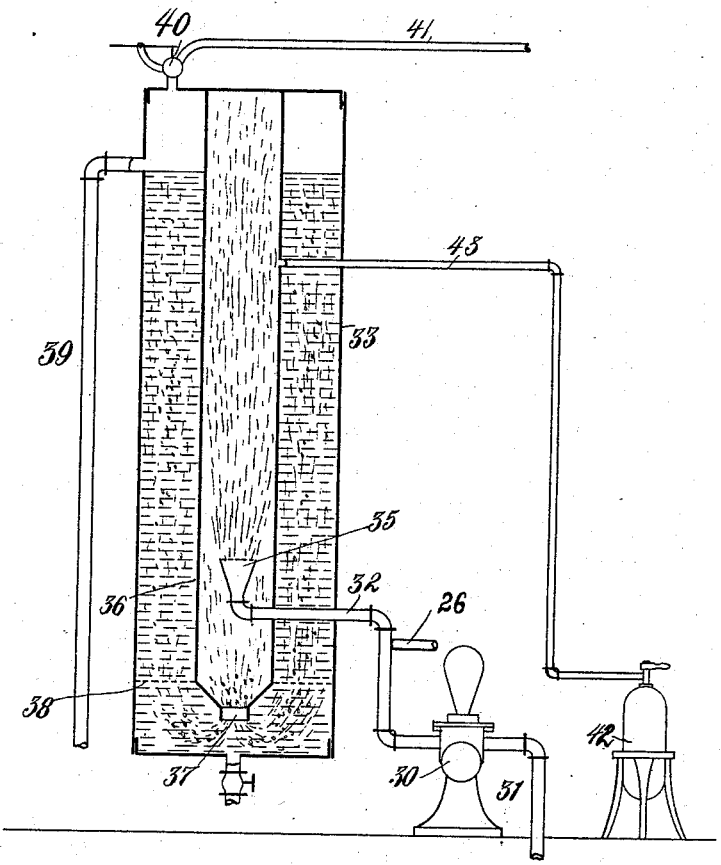
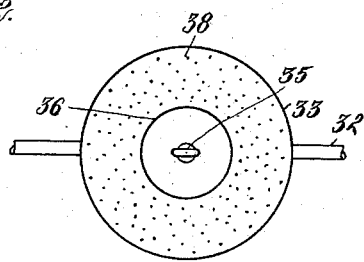
Witnesses:
L. J. Whittemore
O. F. Barthel
Inventor:
Thomas Craney.
By Thos. S. Sprague & Son
Attorneys.

UNITED STATES PATENT OFFICE.

THOMAS CRANEY, OF BAY CITY, MICHIGAN.

APPARATUS FOR AERATING AND CARBONATING WATER.

SPECIFICATION forming part of Letters Patent No. 524,888, dated August 21, 1894.

Application filed August 7, 1893. Serial No. 482,612. (No model.)

*To all whom it may concern:*

Be it known that I, THOMAS CRANEY, a citizen of the United States, residing at Bay City, in the county of Bay and State of Michigan, have invented certain new and useful Improvements in Apparatus for Aerating and Carbonating Water, of which the following is a specification, reference being had therein to the accompanying drawings.

This invention relates to an improvement in apparatus for aerating and carbonating water and other liquids, and it consists in the construction and arrangement of parts hereinafter described and definitely pointed out in the claims.

In the drawings Figure 1 is a vertical central section through the tank showing the pipes in elevation; and Fig. 2 is a top plan view of the tank with the top thereof removed.

This invention is preferably intended for use in connection with a water purifying apparatus, and especially with the apparatus shown and described in my application for Letters Patent, filed June 19, 1893, and serially numbered 478,186.

In the drawings 30 represents a pump which has a suction pipe 31 leading from any suitable source of water supply, preferably from a condensing chamber.

32 is the discharge pipe for the pump entering the tank 33. Just before entering the tank I connect the air pipe 26 into the discharge pipe 32 so that the air is mingled with the water discharged from the pump. The discharge pipe 32 terminates in the nozzle 35 in an inner aerating chamber 36 arranged within the tank 33. This chamber has closed top and sides and has its outlet 37 at the bottom, preferably a restricted outlet. The nozzle 35 discharges upwardly and the mingled air and water will be thrown in a fine spray therein, and the water will be thoroughly aerated. As the spray condenses into fluid it falls to the bottom of the tank 33, the air being forced through the outlet 37 will pass through the fluid in the tank to the top thereof.

38 is a perforated screen near the bottom of the tank 33, which serves to divide the air into small globules or bubbles to more perfectly aerate the water.

39 is the overflow pipe from the tank 33.

40 is a pressure relief valve on the top of the tank 33 and which I preferably connect by means of the suction pipe 41.

If it is desired to carbonate the fluid, carbonic acid gas may be taken from a suitable tank 42 in the pipe 43 and discharged into the aerating chamber 36.

By aerating and carbonating the fluid in a spray under pressure I get the best possible effect.

If desired the carbonic acid gas for carbonating may be commingled with the air and fluid, and discharged through the nozzle into the aerating chamber.

What I claim as my invention is—

1. The combination with a tank having a vertical central compartment closed at its top and having a contracted opening at its bottom, a perforated diaphragm across the space between the inner and outer walls of the tank, an overflow pipe leading out through the upper end of the outer wall of the tank, a valved air outlet at the top of the tank, at one side of and beyond the inner compartment, a fluid conducting pipe entering the inner compartment, a spraying nozzle on the pipe arranged to direct the spray upwardly, a pump for forcing the fluid through the pipe, and an air pipe communicating with the fluid pipe, substantially as described.

2. The combination of a tank, an overflow pipe therefrom, a pressure relief valve therein above the overflow pipe, an inner aerating chamber closed at the top and having a restricted outlet at the bottom near the bottom of the tank, a spraying nozzle in the aerating chamber, a fluid supply pipe connected to the nozzle and a gas pipe connecting into the aerating chamber, substantially as described.

In testimony whereof I affix my signature in presence of two witnesses.

THOMAS CRANEY.

Witnesses:
M. B. O'DOGHERTY,
OTTO F. BARTHEL.